United States Patent [19]

Morimoto

[11] 4,442,518

[45] Apr. 10, 1984

[54] CHANNEL SWITCHING SYSTEM FOR USE IN A DIGITAL COMMUNICATION SYSTEM

[75] Inventor: Hideaki Morimoto, Tokyo, Japan

[73] Assignee: Nippon Electric Company, Ltd., Tokyo, Japan

[21] Appl. No.: 256,225

[22] Filed: Apr. 21, 1981

[30] Foreign Application Priority Data

Apr. 28, 1980 [JP] Japan ................................. 55-57252

[51] Int. Cl.$^3$ ............................................. H04L 1/22
[52] U.S. Cl. ......................................... 371/8; 370/16; 179/175.3 S
[58] Field of Search .................... 370/16; 179/175.3 S, 179/175.3 F; 455/8, 52, 61; 371/8

[56] References Cited

U.S. PATENT DOCUMENTS

| | | | |
|---|---|---|---|
| 3,111,624 | 11/1963 | Farkas | 455/8 |
| 3,364,467 | 1/1968 | Haibt et al. | 179/175.3 S |
| 3,864,533 | 2/1975 | Erlund | 179/175.3 S |
| 4,385,392 | 5/1983 | Angell et al. | 371/8 |

FOREIGN PATENT DOCUMENTS

| | | | |
|---|---|---|---|
| 2525438 | 6/1975 | Fed. Rep. of Germany | 179/175.3 S |
| 2543472 | 9/1975 | Fed. Rep. of Germany | 455/8 |
| 56-122259 | 9/1981 | Japan | 179/175.3 S |

OTHER PUBLICATIONS

Erlund, A. H., "An Automatic Protection System for Digital Lines", IEEE Transaction on Communications, vol. COM-23, No. 4, pp. 478–482, 4/75.

*Primary Examiner*—Jerry Smith
*Assistant Examiner*—Michael R. Fleming
*Attorney, Agent, or Firm*—Sughrue, Mion, Zinn, Macpeak & Seas

[57] ABSTRACT

A channel switching method and system for a digital communication system including a repeater station linked with first and second stations and including first and second regular channels and a standby channel in each direction between the repeater station the first and second stations, one of the regular channels being a regenerative relay channel and the other being a dropping/insertion channel. A first control signal is generated upon the detections of a fault on the first regular channel and a non-fault on the standby channel at the second station. A first control signal is then transmitted from the second station to the first station through the repeater station. The second station is then informed of the presence or absence of a fault on the standby channel between the first station and the repeater station by at least the first control signal. A digital signal is transmitted over the first regular channel and the standby channel simultaneously in response to the first control signal at the first station. The standby channel between the first station and the repeater station is then connected by the repeater station to the standby channel between the repeater station and the second station in response to a third control signal produced in response to the second control signal at the repeater station. After the connection is made, a fourth control signal is transmitted to the second station, whereupon the first regular channel is switched over the standby channel.

10 Claims, 9 Drawing Figures

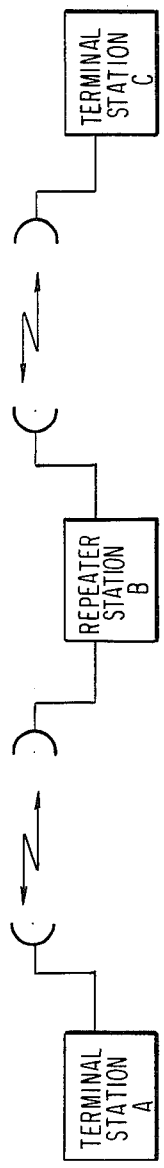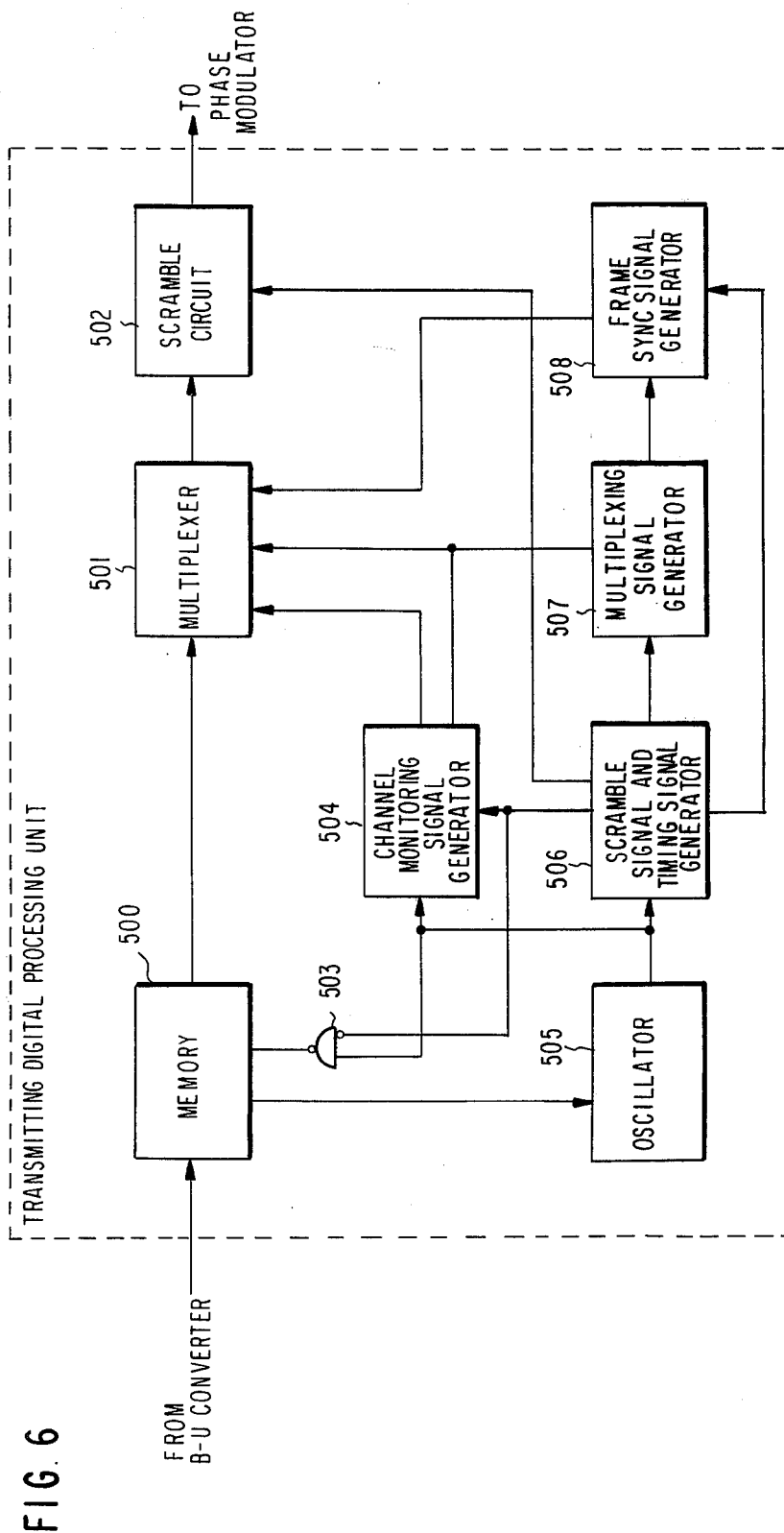
FIG. 1
FIG. 6

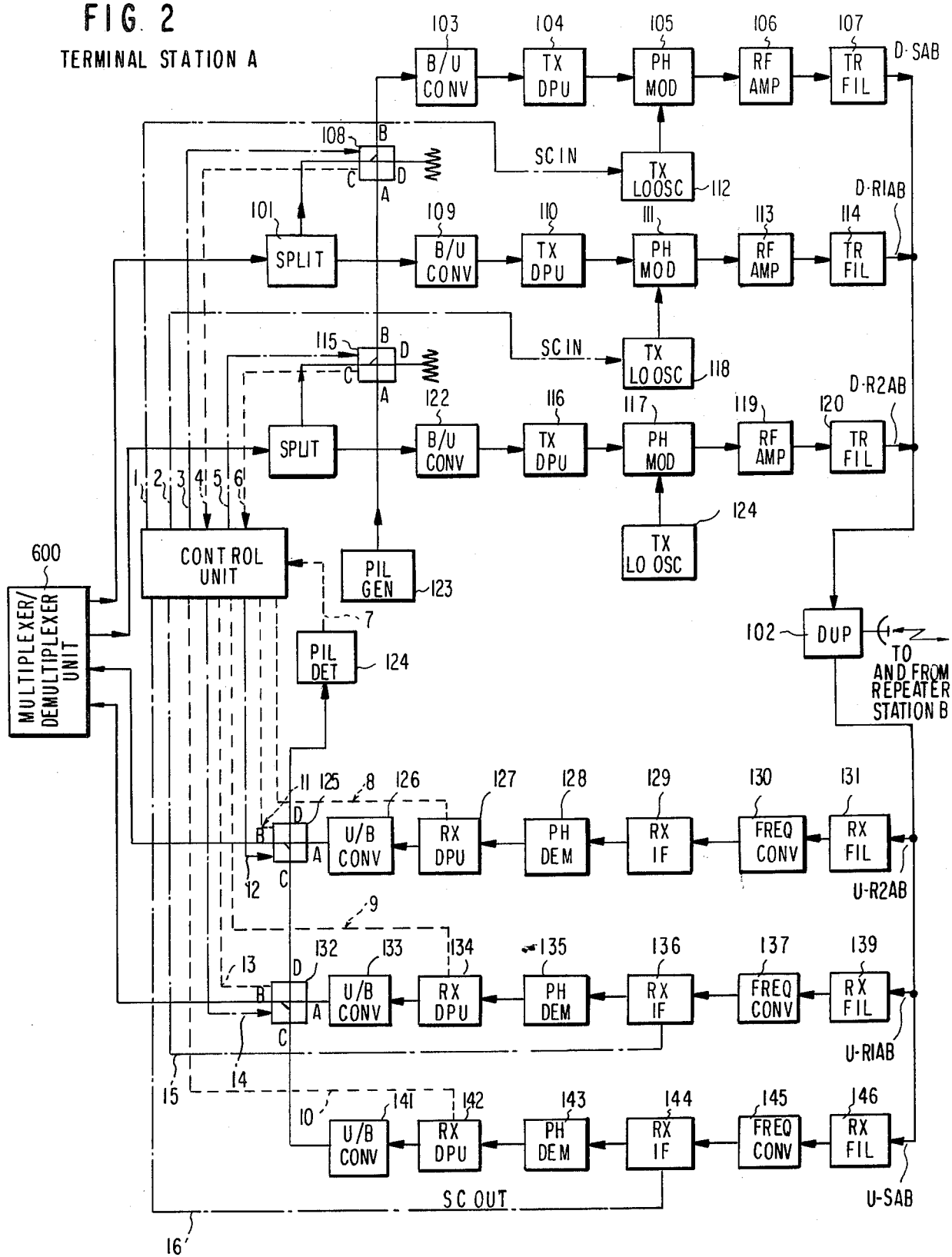

REPEATER STATION B'

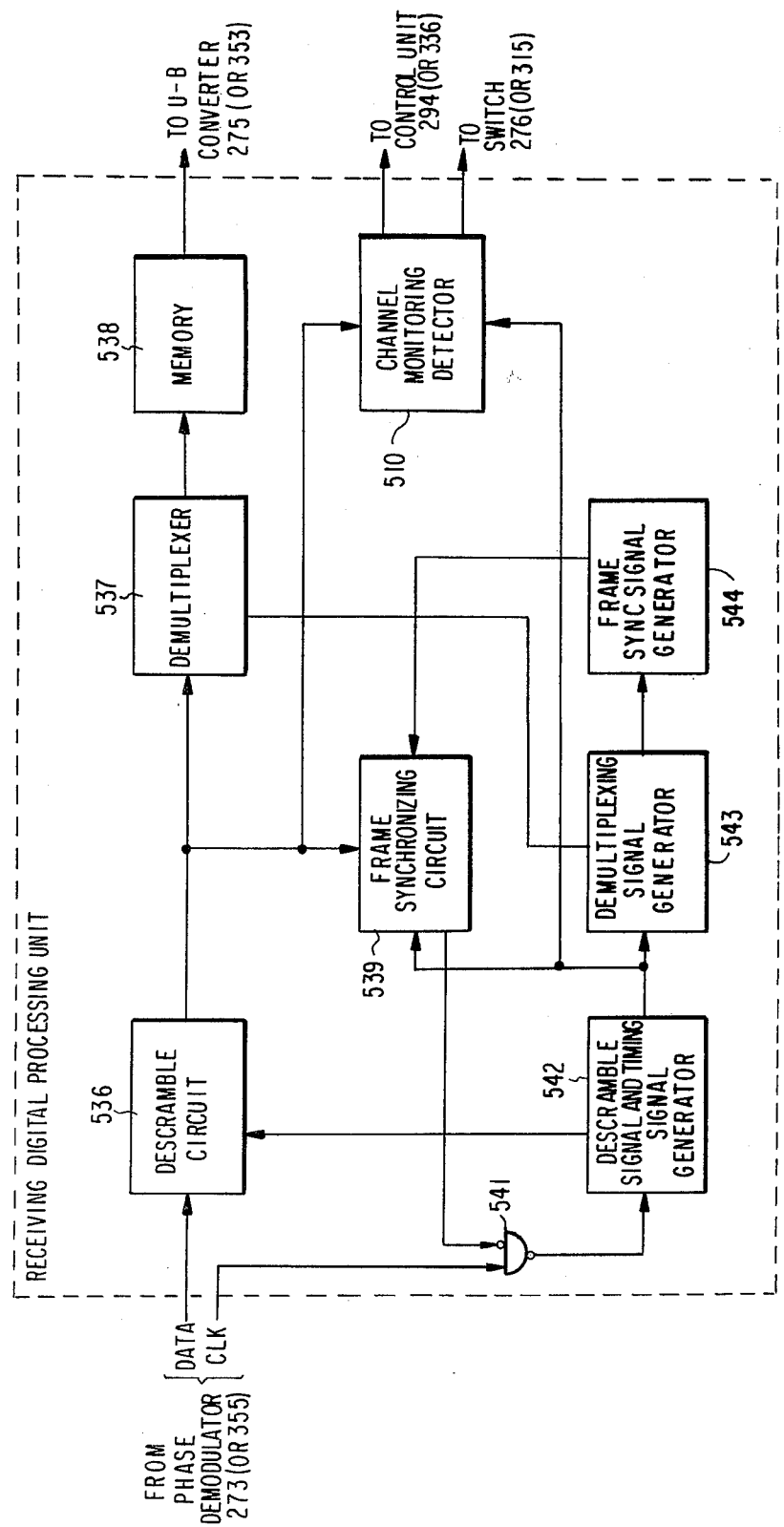

CHANNEL SWITCHING SYSTEM FOR USE IN A DIGITAL COMMUNICATION SYSTEM

BACKGROUND OF INVENTION

The present invention relates to a channel switching system for use in a digital communication system having one standby channel for N regular channels (1:N, N being a positive integer), and more particularly to a channel switching system for use in a digital communication system having a repeater station linked between two terminal stations and having a regenerative relay channel and a dropping/insertion channel for regular channels of the repeater station.

Usually, such a channel switching system consists of two terminal stations and a repeater to relay the transmission and reception of digital signals between the terminal stations. Each such station has a control device for switching over between regular and standby channels or routes to provide stable communications. In the repeater station of such a system, it has been customary to provide those digital channels needing no dropping and/or insertion, as in the case of a regenerative relay, with a digital code processing unit or with a modulating-demodulating circuit and a digital code processing unit, as will be described hereinafter, and to construct them in the same way as those which do require dropping and/or insertion. This technique is disadvantageous in that the repeater station is costly. The per channel cost in such a system can be reduced by constructing the regenerative relay channels at the repeater station without a digital code processing circuit or the like. However, if both regenerative relay circuits with dropping/insertion circuits having digital code processing circuits and modulating-demodulating circuits are provided together in the same system, the conventional channel switching system cannot be simply applied for the reason to be explained below.

SUMMARY OF THE INVENTION

An object of the present invention is therefore to provide a channel switching system for use in a digital communication system capable of efficiently switching dropping/insertion channels, involving digital code processing circuits and channel switching functions of the repeater station, and regenerative relay channels, involving no digital code processing circuits and no channel switching functions at the repeater station, over to standby channels.

According to the present invention, there is provided channel switching system for use in digital communication system having a repeater station linking first and second stations with at least first and second regular channels and a standby channel, the first and second regular channels including a regenerative relay channel and a dropping/insertion channel at the repeater station, respectively, and the various channels being capable of carrying digital signals. This system operates in accordance with the method including the steps of:

(1) detecting at the second station a channel fault condition on each of the first regular channel and standby channel and providing a first control signal upon detections of a fault on the first regular channel and a non-fault on the standby channel;

(2) transmitting at the second station the first control signal from the second station to the first station through the repeater station;

(3) transmitting at the first station the digital signal over the first regular channel and the standby channel in response to the first control signal, providing a second control signal indicative of such transmitting, and transmitting the second control signal to the repeater station;

(4) transmitting at the repeater station a third control signal indicative of the presence or absence of a fault on the standby channel between the first station and the repeater station to the second station in response to at least the second control signal;

(5) providing at the repeater station a fourth control signal in response to at least the second control signal;

(6) connecting at the repeater station the standby channel between the first station and the repeater station to the standby channel between the repeater station and the second station in response to the fourth control signal, and providing a fifth control signal indicative of such connecting;

(7) transmitting at the repeater station the fifth control signal to the second station; and (8) switching over at the second station the first regular channel to the standby channel in response to at least the third and fifth control signals at the second station.

BRIEF DESCRIPTION OF DRAWINGS

The aforementioned object and, other objects and features of the invention will be more apparent from the detailed description hereunder taken in conjunction with the accompanying drawings, wherein:

FIG. 1 is a conceptual diagram of a digital radio communication system;

FIG. 2 is a block diagram illustrating an example of the terminal station A shown in FIG. 1;

FIG. 6 is a block diagram of a transmitting digital processing unit for the terminal stations A and C, and the repeater station B shown in FIG. 3;

FIG. 9 is a block diagram of the receiving digital processing unit 274 or 354 for the repeater station B' shown in FIG. 5.

DETAILED DESCRIPTION OF THE INVENTION

Figure 3A:
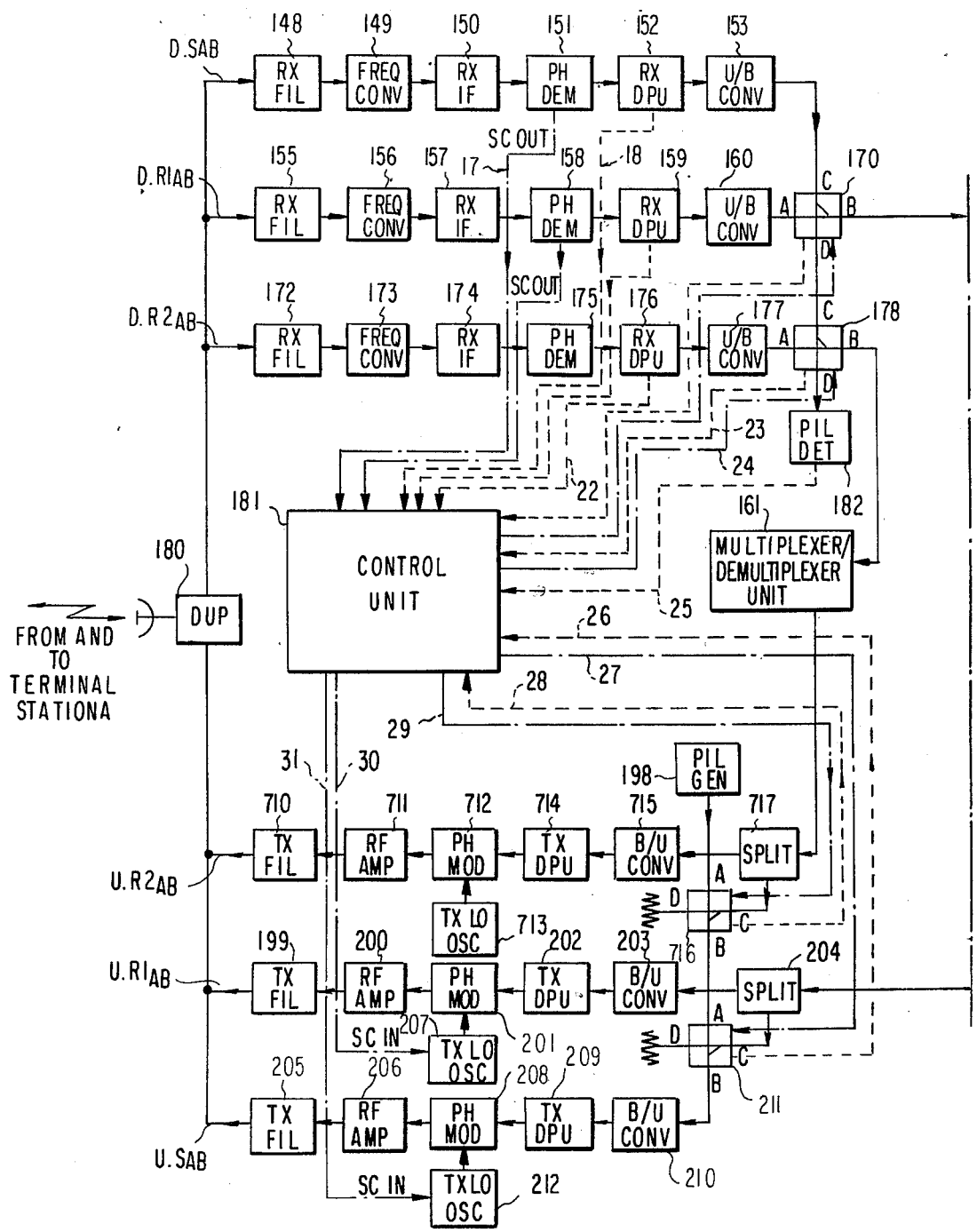
FIG. 3 is a block diagram illustrating a prior art example of the repeater station B shown in FIG. 1.
Figure 3B:
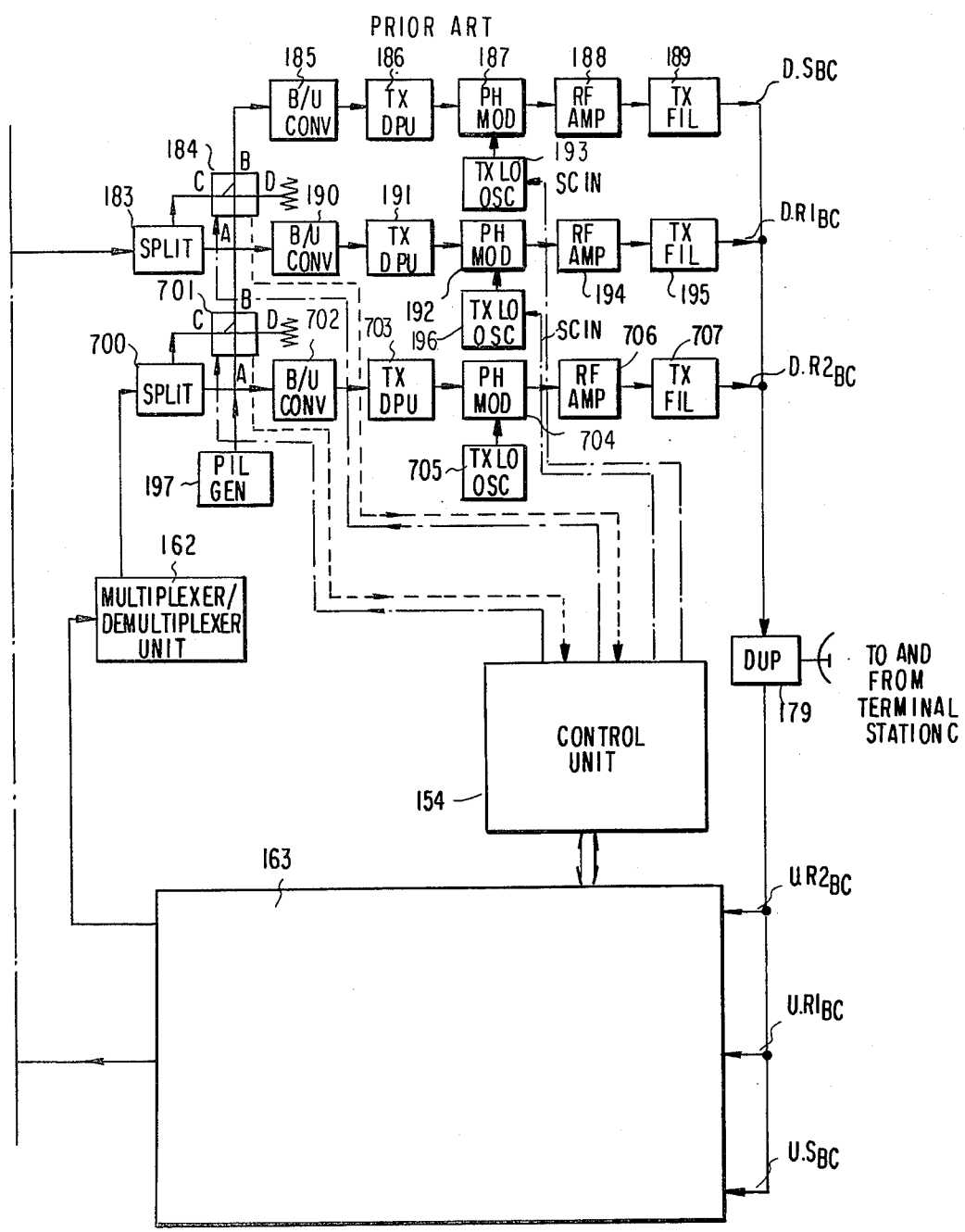
Figure 4:
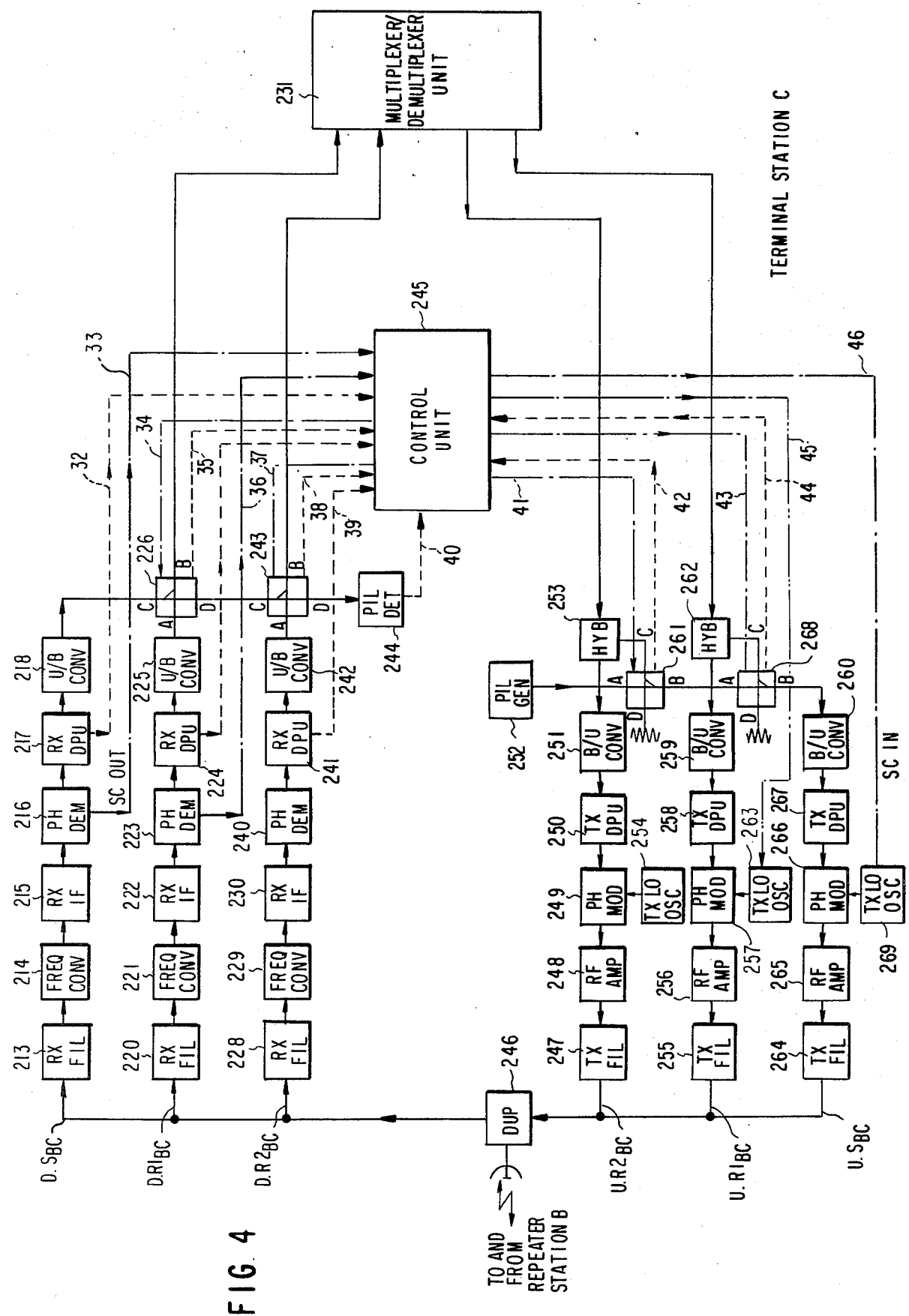
FIG. 4 is a block diagram illustrating an example of the terminal station C shown in FIG. 1.

Referring to FIG. 1, digital signals are transmitted over digital channels both from the terminal station A by way of the repeater station B to the terminal station C and vice versa. Such digital channels usually consist of regular and standby channels in a ratio of N:1, where N is a positive integer. In FIGS. 2, 3 and 4 are respectively shown specific block diagrams of the terminal station A, conventional detective repeater station B and terminal station C, where N equals 2. A conventional system of this type is disclosed in the Conference Record (Vol. II) of the 1976 International Conference on Communications, pp. 18-27 through 18-32.

The terminal station A of FIG. 2 is composed of a transmitter section, control unit 100, duplexer 102, receiver section, and multiplexer unit 600. The transmitter section comprises splitters 101 and 121; B/U (bipolar-unipolar) converters 103, 109 and 122; transmitting digital code processing units 104, 110 and 116; phase modulators 105, 111 and 117; RF amplifiers 106, 113 and 119; transmitting filters 107, 114 and 120; switchover circuits 108 and 115; local oscillators 112, 118 and 124, and a pilot generator 123. The receiver section consists of switchover circuits 125 and 132;U/B converters 126, 133 and 141; receiving digital code processing units 127, 134 and 142; phase demodulators 128, 135 and 143; IF circuits 129, 136 and 144; frequency converters 130, 137 and 145; receiving filters 131, 139 and 146, and pilot detector 124. Reference numerals 1 through 16 represent signal lines. Reference characters $D.S_{AB}$, $D.R1_{AB}$ and $D.R2_{AB}$ represent a standby channel, first regular channel, respectively, in the downstream (or eastward) direction between the stations A and B; and $U.S_{AB}$, $U.R1_{AB}$ and $U.R2_{AB}$, a standby channel, first regular channel and second regular channel, respectively, in the upstream (or westward) direction between the stations A and B.

The repeater station B of FIG. 3 is constructed of a downstream receiver section, downstream transmitter section, upstream receiver section 163, upstream transmitter section, multiplexer/demultiplexer units 161 and 162, control units 181 and 154, and duplexers 179 and 180. The downstream receiver section, like the receiver section shown in FIG. 2, consists of receiving filters 148, 155 and 172; frequency converters 149, 156 and 173; IF circuits 150, 157 and 174; phase demodulators 151, 158 and 175, receiving digital code processing units 152, 159 and 176; U/B converters 153; 160 and 177; switchover circuits 170 and 178; and a pilot detector 182. The upstream receiver section 163 is constructed similarly to the downstream receiver section. The downstream transmitter section, like the transmitter section shown in FIG. 2, consists of splitters 183 and 700; switchover circuits 184 and 701; B/U converters 185, 190 and 702; transmitting digital code processing units 186, 191 and 703; phase modulators 187, 192 and 704; RF amplifiers 188, 194 and 706; transmitting filters 189, 195 and 707; local oscillators 193, 196 and 705; and a pilot generator 197. The upstream transmitter section, like the downstream transmitter section, comprises receiving filters 199, 205 and 710; RF amplifiers 200, 206 and 711; phase modulators 201, 208 and 712; transmitting digital code processing units 202, 209 and 714; B/U converters 203, 210 and 715; switchover circuits 211 and 716; splitters 204 and 717; a pilot generator 198; and local oscillators 207, 212 and 713. Reference numerals 17 through 31 and 47 represent signal lines. Reference characters $D.R_{BC}$, $D.R1_{BC}$ and $D.R2_{BC}$ respectively represent a downstream standby channel, first regular channel and second regular channel between the stations B and C; and $U.R_{BC}$, $U.R1_{BC}$ and $U.R2_{BC}$, respectively, an upstream standby channel, first regular channel and second regular channel between the stations B and C.

The terminal station C shown in FIG. 4, like its counterpart in FIG. 2, is composed of a duplexer 246, control unit 245, multiplexer/demultiplexer 231, receiver station and transmitter section. The receiver section consists of receiving filters 213, 220 and 228; frequency converters 214, 221 and 229; IF circuits 215, 222 and 230; phase demodulators 216, 223 and 240; receiving digital processing units 217, 224 and 241; U/B converters 218, 225 and 242; switchover circuits 226 and 243; and a pilot detector 244. The transmitter section comprises transmitting filters 247, 255 and 264; RF amplifiers 248, 256 and 265; phase modulators 249, 257 and 266; transmitting digital processing units 250, 258 and 267; B/U converters 251, 259 and 260; switchover circuits 261 and 268; local oscillators 245, 263 and 269; splitters 253 and 262; and a pilot generator 252. Reference numerals 32 through 46 represent signal lines.

First will be described the transmission and reception of digital signals and the like between the terminal stations A and C via the repeater station B.

Digital signals multiplexed by the multiplexer/demultiplexer unit 600 of the terminal station A (FIG. 2) are supplied through the splitter 101 (121) to the B/U converter 109 (122), which converts bipolar signals into unipolar signals. The output of this converter 109 (122) is supplied to the transmitting digital processing unit 110 (116), wherein, as shown in FIG. 6, the multiplexed signals from the B/U converter are read into a memory 500 in response to a clock pulse signal generated by an oscillator circuit 505, having a frequency slightly higher than that of the data bit rate of the input multiplexed signals. By controlling the output data rate with a gate 503, the frequency of the multiplexed signals and the output frequency from the gate 503 of the transmitting digital processing circuit are made identical with each other. Herein, the output data rate of the memory 500 corresponds to the frequency sequence of the oscillator circuit 505. Therefore the output data of the memory when under control by the gate 503 have the same value for two consecutive bits, into one of which is inserted by a multiplexer circuit 501 either a frame synchronizing signal from a frame synchronizing signal generator 508 or a channel monitoring signal from a channel monitoring signal generator 504. In a scramble circuit 502, the output signal of the circuit 501 is scrambled with a scramble signal from a scramble signal and timing signal generator 506 to achieve an even output spectrum so that stable receiving coherent detection can be carried out. The resultant output is fed to a phase modulator. A multiplexing signal generator 507 controls the multiplexer 501 and the generator 508.

The phase modulator 111 (117) shown in FIG. 2 phase-modulates a carrier signal from the local oscillator 118 (124) with a digital signal (main signal) from the scramble circuit 502. This carrier signal from the local oscillator 118, as will be explained below, is subjected to, for instance, frequency modulation by a control signal (sub-signal) from the control unit 100. Thus the output of the phase modulator 111 is a double-modulated carrier signal, while that of the phase modulator 117 is a carrier wave modulated by a digital signal (main signal) alone. These modulated carrier signals are transmitted to the repeater station B (FIG. 3) through the RF amplifier 113 (119), filter 114 (120) and duplexer 102.

The modulated carrier signal after passing through the duplexer 180, filter 155 (172), frequency converter 156 (173) and IF circuit 157 (174) is demodulated in the phase demodulator 158 (175) of the repeater station B (FIG. 3). The phase demodulator 158 generates a digital main signal and a control signal, which are respectively supplied to the digital processing unit 159 and control unit 181. Meanwhile, the phase demodulator 175 generates a digital main signal, which is fed to the digital processing unit 176. A clock CLK is also supplied from the demodulator 158 (175) to the digital processing unit 159 (176).

Figure 7:
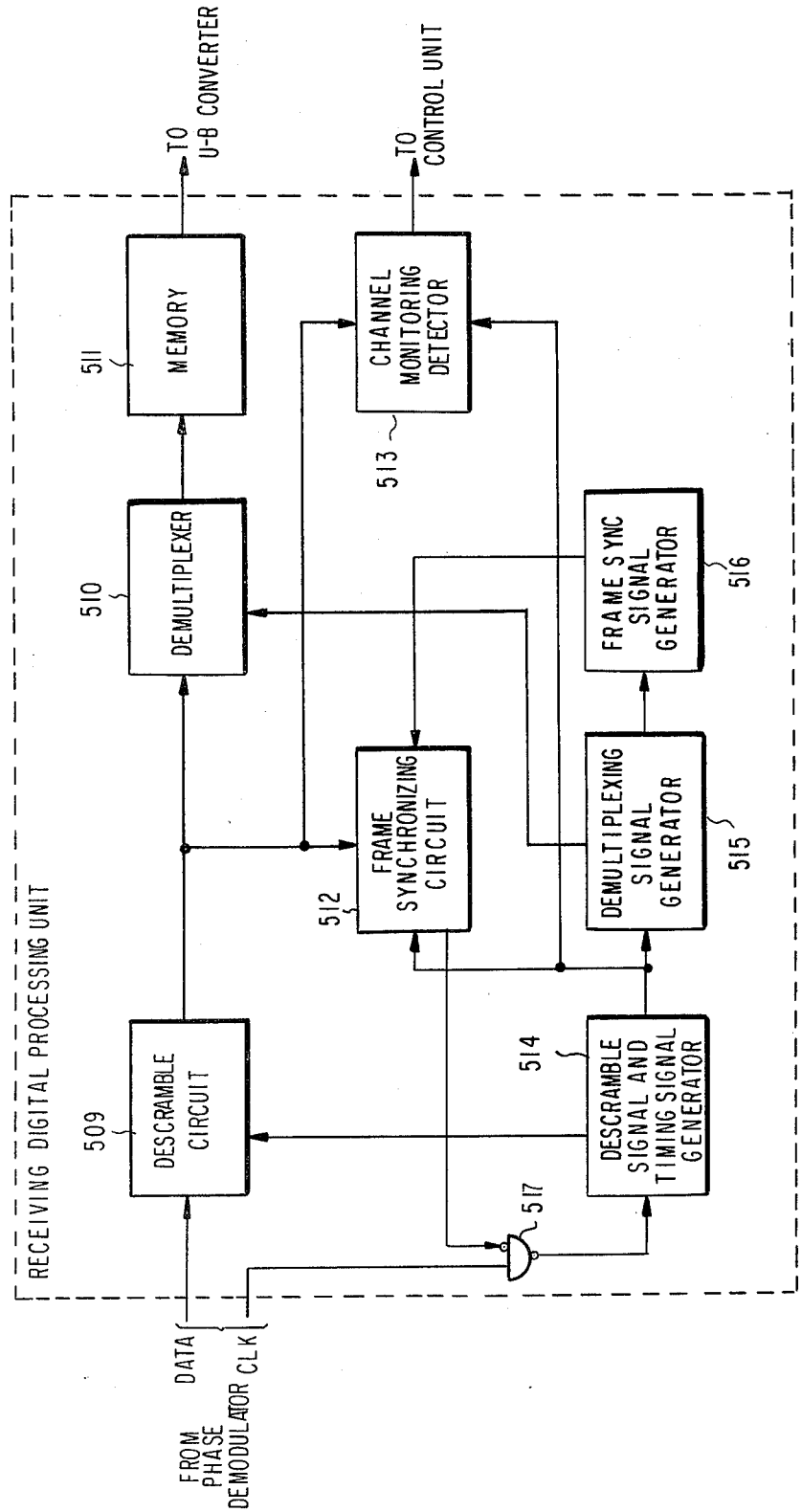
FIG. 7 is a block diagram of a receiving digital processing unit for the terminal stations A and C, and the repeater station B shown in FIG. 3.

The following operations take place in the receiving digital processing circuit as illustrated in FIG. 7. The clock pulse signal CLK from the phase demodulator circuit 158 (175) is fed to a descramble signal and timing signal generator 514 by way of a gate 517. Data from the demodulator is descrambled using this descramble signal from the generator 514. A demultiplexing signal generator 515, in response to the output of the generator 514, generates a demultiplexing signal which is used to eliminate the frame synchronizing signal and channel monitoring signal inserted at the terminal station A. A frame synchronizing circuit 512, in response to signals from a frame sync signal generator 516 and the descramble circuit 509, establishes frame synchronization. Channel monitoring at a channel monitoring detector 513 is achieved by comparing the channel monitoring signal sent from the transmitting side with the same signal generated on the receiving side as the channel monitoring signal. To be more specific, when the signal sent from the channel monitoring signal generator 504 on the transmitting side under normal conditions is "1101000", the corresponding signal generated in the detector 513 on the receiving side will also be "1101000" if the channel is normal. An exclusive OR operation performed between the two would yield "0000000", indicating the normal state of the channel. If the quality of the radio channel deteriorates, the exclusive OR operation resulting from "1001100" as the channel monitoring signal from the transmitting side may, for instance, be "0100100", indicating the generation of two erroneous pulses during this period. Accordingly, if it is so arranged that a channel fault alarm is issued at a channel error rate of, for example, $10^{-4}$, the channel will be switched over upon one erroneous pulse or more per 10,000 pulses. This channel fault alarm is fed to the control unit 181. After the channel monitoring and frame sync signals added over the radio channel are removed by the demultiplexer circuit 510, conversion into the original frequency sequence of multiplexed signals is achieved by a memory 511 for supply to the U/B conversion circuit 160 (177). The output of the U/B converter 160 is supplied to the splitter 183, without undergoing dropping or insertion, by way of the switchover circuit 170.

The output of the splitter 183 is supplied to the phase modulator 192 by way of the B/U converter 190 and digital processing unit 191 and, as in the terminal station A, a double-modulated carrier wave is transmitted to the terminal station C (FIG. 4) through the RF amplifier 194, filter 195 and duplexer.

On the other hand, the output of the U/B converter 177 is supplied to the multiplexer/demultiplexer unit 161 through the switchover circuit 178 and is selectively dropped to provide demultiplexed signals. The multiplexed signals newly inserted in the multiplexer/demultiplexer unit 162 are supplied to the phase modulator 704 by way of the splitter 700, B/U converter 702 and digital processing unit 703 and, as in the terminal station A, a modulated carrier signal is transmitted to the terminal station C (FIG. 4).

The modulated carrier signals are demodulated by the phase demodulators 223 and 240 of the terminal station C (FIG. 4), as at the repeater station B. A digital main signal from the phase demodulator 223 (240) is fed to the digital processing unit 224 (241), in which the signal is processed as stated above, and then supplied, for demultiplexing to the multiplexer/demultiplexer unit 231 through the U/B converter 225 (242) and switchover circuit 226 (243).

Conversely, signal transmission from the terminal station C to A is achieved in the same manner as described above over an upstream channel.

Next will be described the switchover operation used to achieve dropping and insertion at a conventional repeater station B (FIG. 3). Since in this case the channels or routes between the terminal station A and repeater station B and between the repeater station B and terminal station C are independently switched over to each other, the following description will refer only to the first downstream regular channel (D.R1$_{AB}$) between the terminal station A and repeater station B as an example without loss of generality.

Input signals, multiplexed by the multiplexer circuit 600 are branched by the splitter 101 and fed to the B/U converter 109 and the switchover circuit 108. This switchover circuit 108, when the channel D.R1$_{AB}$ is normal, is terminated at terminal D with signals flowing from terminal C to D. Bipolar signals inputted to the B/U converter 109, after being converted into unipolar signals which are more readily processible, are fed to the transmitting digital processing unit 110 and, after the insertion there-into of such signals required on the radio channel as the frame sync signal and channel monitoring signal as stated above, are modulated by the modulator circuit 111. The modulated signals are amplified by the RF amplifier circuit 113, pass through the filter 114 to eliminate unwanted components and are transmitted from an antenna by way of the duplexer 102 to the repeater station B (FIG. 3).

Meanwhile over the standby channel (D.S$_{AB}$), a pilot signal from the pilot generator 123, passing the switchover circuits 115 and 108 from terminal A to B, is supplied to the B/U converter circuit 103 for the standby channel, undergoes the same digital processing by the circuit 104 as on a regular channel, and is modulated, amplified and transmitted to the repeater station B (FIG. 3). The switchover circuits 108 and 115 are respectively controlled in response to switchover control signals 3 and 5 from the control unit 100. Information signals 4 and 6, indicating that these switchover circuits 108 and 115 have operated, are fed to the control unit 100.

On the receiving side of the repeater station B, the signals, after passing the duplexer 180, are selectively branched in the filters 148 and 155 into signals for the standby channel (D.S$_{AB}$) and regular channel (D.R1$_{AB}$), and converted to intermediate frequencies by the frequency converters 149 and 156. The signals are then amplified by the receiving IF circuits 150 and 157, respectively. The amplified signals undergo detection by the phase demodulator circuits 151 and 158, respectively, after which they are fed to the receiving digital processing units 152 and 159, in which the demodulated signals are cleared of the aforementioned frame synchronizing signal and channel monitoring signal and then inputted to the U/B converter circuits 153 and 160.

The output of the U/B converter circuit 160 passes the receiving switchover circuit 170 from terminal A to B, and is supplied to the splitter 183 of the transmitter section. On the other hand, the output of the U/B converter circuit 177, to undergo dropping and or insertion, passes the switchover circuit 178 from terminal A to B, and is fed to the multiplexer/demultiplexer unit 161.

The output of the U/B converter circuit 153 passes the switchover circuits 170 and 178 from terminal C to D, and is inputted to the pilot detector 182, where the signal sent from the pilot generator 123 of the terminal station A is detected to check whether or not the pilot signal is being normally received. Also, the channel monitoring detector 513 (FIG. 7) in the digital processing unit 152 monitors the standby channel. Thus the digital processing unit 152 and pilot detector 182 monitor whether or not there is any abnormality on the standby channel ($D.S_{AB}$).

Channel fault alarms 18, 19 and 22 from the digital processing units 152, 159 and 176, i.e. from detectors 513 (FIG. 7), and an output signal 25 from the pilot detector 182 are supplied to the control unit 181. The switchover circuits 170 and 178 are controlled by switchover control signals from the control unit 181, and information signals (switchover completion signals), indicating that the switchover circuits 170 and 178 have operated, are supplied over the lines 20 and 23 to the control unit 181.

The control signal (sub-signal), as stated above, further frequency-modulates the carrier signal already modulated by the digital main signal, and is transmitted over a control channel, which is carried, for example, over the standby channel and first regular channel.

The control channel between the terminal station A and the repeater station B in the downstream direction, on the transmitting side, supplies signals 1 and 2 from the control unit 100 to the transmitting local oscillators 112 and 118 shown in FIG. 2, and transmits frequency-modulated signals to the repeater station B. On the receiving side of the repeater station B (FIG. 3), demodulated signals 17 and 47, respectively corresponding to the signals 1 and 2, are supplied from the phase demodulators 151 and 158 to the control unit 181.

The control channel in the upstream direction (from the repeater station B to the terminal station A), as that in the downstream direction, supplies signals 30 and 31 from the control unit 181 on the transmitting side of the station B to the transmitting local oscillators 207 and 212, respectively, and transmits frequency-modulated signals. On the receiving side of the terminal station A (FIG. 2), demodulated signals 15 and 16, respectively corresponding to the signals 30 and 31, are supplied from the phase demodulators 135 and 143 to the control unit 100.

Next will be described the switchover operation. When a fault occurs on the first regular channel $D.R1_{AB}$, switchover is effected in the following mode:

(1) A channel fault alarm signal 19 from the digital processing unit 159 (FIG. 3) is fed to the control unit 181.

(2) If the downstream standby channel is in a normal state (i.e. neither a channel fault alarm signal 18 from the circuit 152 nor a pilot-off signal 25 from the circuit 182 is present), the control unit 181 generates a switchover signal 30 (or 31), and frequency-modulates the carrier signal from the transmitting local oscillator 207 (or 212). The FM signals so produced are demodulated by the phase demondulator circuit 135 (or 143) of the terminal station A, and fed to the control unit 100 by way of a signal line 15 (or 16).

(3) As the switchover circuit 108 is controlled by a transmitting switchover control signal 3 from the control unit 100, signals which were flowing from C to D, the same signals as those on the first regular channel $D.R1_{AB}$, will flow on the standby channel $D.S_{AB}$ by way of the route from C to B.

After the switchover operation is complete, the switchover circuit 108 supplies the control unit 100 with a switchover completion information signal 4.

This information signal 4 is transmitted to the repeater station over the downstream control channel. A signal 1 (or 2), corresponding to this information signal 4, is frequency-modulated by the transmitting local oscillator 112 (or 118). The resultant FM signal is demodulated by the receiving demodulator 151 (or 158) in FIG. 3, and fed to the control unit 181 by way of the signal line 17 (or 47).

(4) The control unit 181 monitors the switchover completion information signal demodulated by the phase demodulator 151 (or 158), information indicating the absence of channel fault in the receiving digital unit 152 (or 159) and information indicating the cutoff of the pilot signal at the pilot detector 182 (not a signal from the pilot generator 123 (FIG. 2) in this case, but a signal indicating whether or not the pilot is cut off by the presence of multiplexed signals into the pilot detector 182) and, if satisfied in all these respects, generates a switchover signal 21 to control the receiving switchover circuit 170.

(5) As the switchover circuit 170 is so controlled, the signals which previously flowed from A to B are switched over to the route from C to B. At this time, the switchover completion signal from the switchover circuit 170 is sent to the control unit 181 over a signal route 20 and further to the terminal station A over the upstream control channel to fully complete the switchover operation. (If this procedure is interrupted while it is being carried out, the switchover will be made impossible.)

Signals on the first regular channel will again be supplied to the transmitting digital converter 191 by way of the transmitting splitter 183 and B/U converter 190 of the repeater station B, undergoing there digital conversion (insertion of the channel monitoring signal and frame synchronizing signal), modulation and amplification, and are transmitted to the terminal station C (FIG. 4), which is constructed and which operates similar to the station A.

Since the second regular channel from the station A to the station B ($D.R2_{AB}$) is branched at the station B, digital signals are supplied to the multiplexer/demultiplexer unit 161 by way of the receiving switchover circuit 178.

Here the first regular channel will be considered. Although the channel monitoring signal and frame synchronizing signal are newly inserted between the stations B and C by the circuit 191, because the station B essentially is required to perform no function other than that of a regenerative relay, the circuits 159, 160, 170, 183, 184, 190 and 191 are unnecessary, and instead channel monitoring can be achieved by the digital processing unit 224 of the station C (FIG. 4).

Figure 5A:
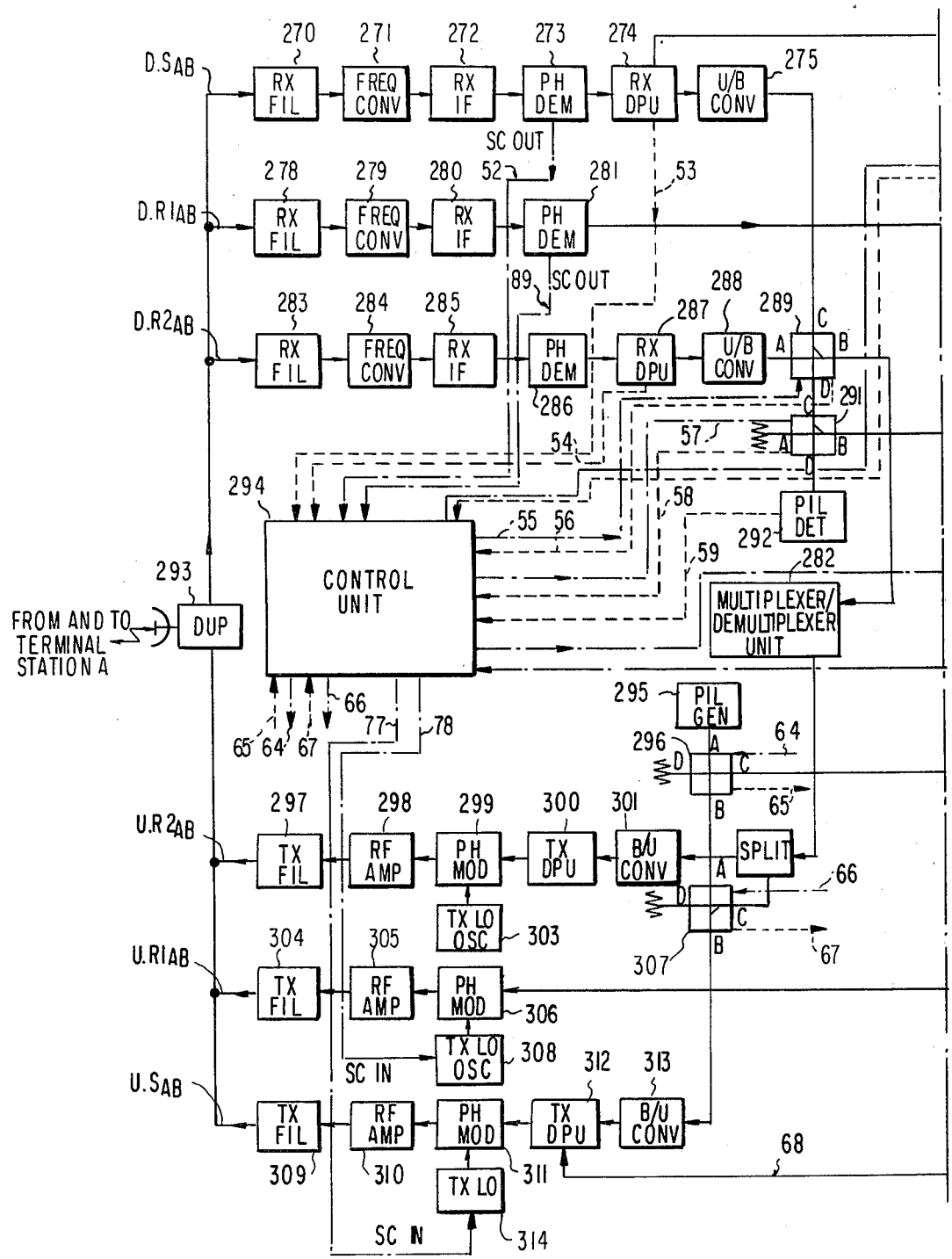
FIG. 5 is a block diagram illustrating an example of the repeater station B' according to the present invention.
Figure 5B:
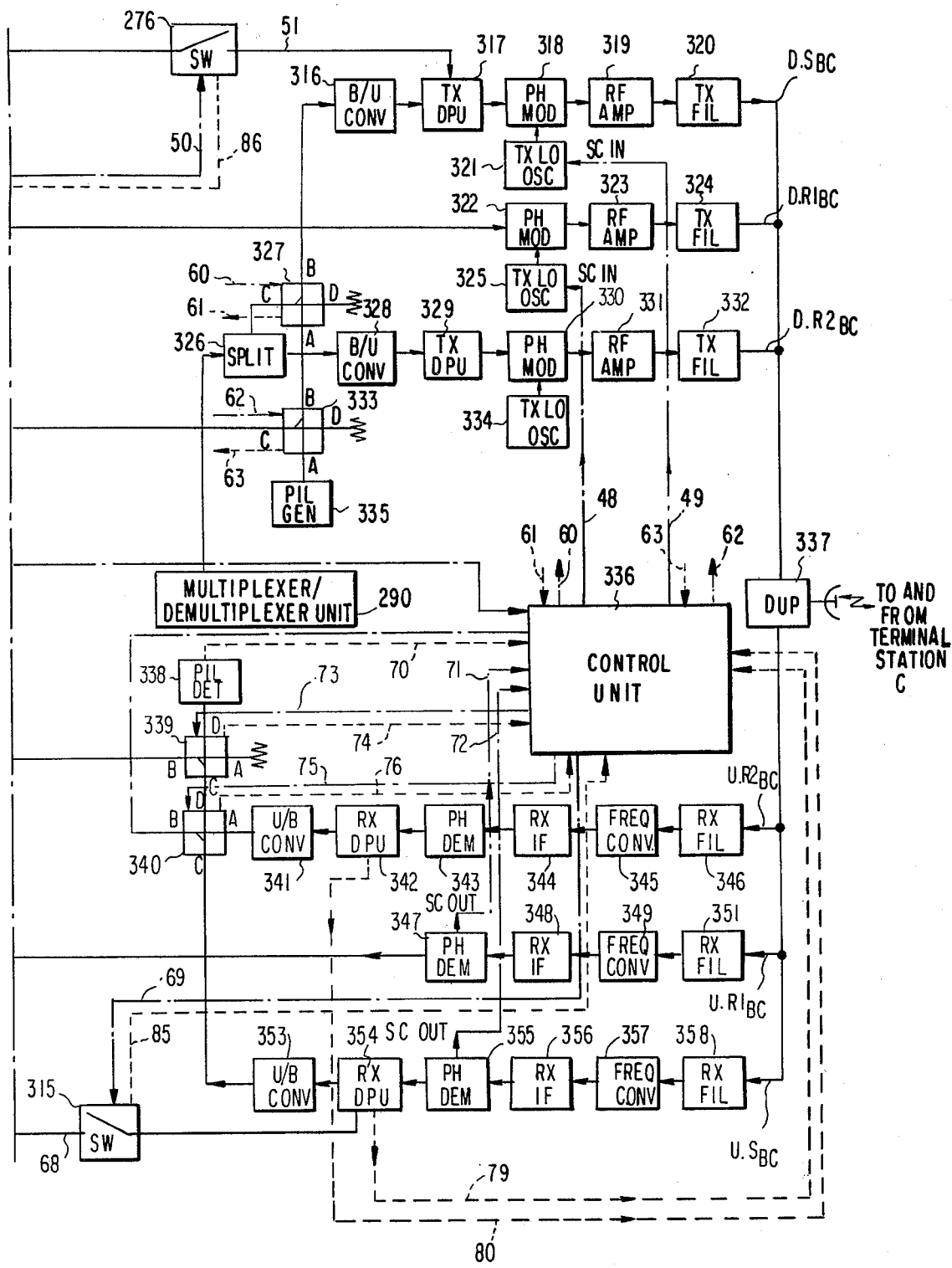

FIG. 5 is a block diagram of a repeater station B', constructed according to the invention for use in the digital channel switching system. The repeater station B' in FIG. 5 consists of a downstream receiver section, downstream transmitter section, upstream receiver section, upstream transmitter section, duplexers 293 and 337, control units 294 and 336, multiplexer/demultiplexer units 282 and 292, and switches 276 and 315. The downstream receiver section includes filters 270, 278 and 283; frequency converters 271, 279 and 284; IF circuits 272, 280 and 285; phase demodulators 273, 281 and 286; digital processing units 274 and 287; U/B converters 275 and 288; switchover circuits 289 and 291; and a pilot detector 292. The downstream transmitter section is made up of a splitter 326; switchover circuits 327 and 333; B/U converters 316 and 328; transmitting digital processing units 317 and 329; phase modulators 318, 322 and 330; RF amplifiers 319, 323 and 331; filters 320, 324 and 332, and local oscillators 321, 325 and 334. The upstream receiver section, like its downstream counterpart, comprises filter 346, 351 and 358; frequency converters 345, 349 and 357; IF circuits 344, 348 and 356; phase demodulators 343, 347 and 355; receiving digital processing units 342 and 354; U/B converters 341 and 353; switchover circuits 339 and 340; and a pilot detector 338. The upstream transmitter section, as its downstream counterpart, is made up of a splitter 302; switchover circuits 296 and 307; a pilot generator 295; B/U converters 301 and 313; transmitting digital processing units 300 and 312; phase modulators 299, 306 and 311; RF amplifiers 298, 305 and 310; filters 297, 304 and 309; and local oscillators 303, 308 and 314. Reference numerals 48 through 50, 52 through 67, and 69 through 86 represent signal lines; and 51 and 68, short lines.

Next will be explained the switchover operation of the digital channel switching system according to the present invention with reference to FIGS. 5, 2 and 4, in the order of the first downstream regular channels $D.R1_{AB}$ and $D.R1_{BC}$, and second downstream regular channels $D.R2_{AB}$ and $D.R2_{BC}$.

The switchover procedure in the event of a fault on the first regular channel will be described below.

(1) A channel fault signal detected by the receiving digital processing unit 224 of the terminal station C (FIG. 4) is fed to the control unit 245 by way of the line 40. (2) If both the output 32 of the receiving digital processing unit 217 for the standby channel $D.S_{BC}$ and the output 40 of the pilot detector 244 are normal, a parallel transmission command signal (i.e. a switchover signal) is sent from the control unit 245 to the repeater station B (FIG. 5) by way of the upstream control channel. This switchover signal is transmitted by frequency-modulating the carrier signal of the transmitting local oscillator 263 (or 269) by way of the line 45 (or 46), demodulated by the receiving demodulator circuit 347 (or 355) of the station B' (FIG. 5), and supplied to the control unit 336 by way of the line 71 (or 72).

(3) At the station B' of FIG. 5, where no transmitting switchover circuit 184 is provided, unlike at the station B of FIG. 3, the parallel transmission command signal (the switchover signal) has to be transferred to the terminal station A (FIG. 2). Therefore, due to the absence of a transmitting switchover circuit at the station B', the parallel transmission command signal from the station C is inputted to the control unit 336, which controls the standby channel switchover circuit 333 through the line 62.

(4) Upon arrival of the parallel transmission command signal from the station C (FIG. 4), the signal is sent from the control unit 336 to the station A (FIG. 2) in the following manner:

The control unit 294, which receives the parallel transmission signal from the control unit 336 which is to be sent to the station A by way of the line 87, controls the switching circuit 276 through the line 50 to inform the standby channels of the stations B' and C that the standby channel between the stations A and B' is in a normal state in response to the absence of a standby channel fault signal from the receiving digital processing unit 274 for the standby channel (i.e. the line 53 is open) and to the detection of a pilot signal by the pilot detector 292 (i.e. the line 59 is open).

(5) The switch 276 is used for informing the station C of the presence or absence of a fault on the standby channel $D.S_{AB}$ between the stations A and B'. Thus, whereas a switchover to a standby channel is required in the presence of a fault on the first regular channel, if there is a fault on the standby channel $D.S_{AB}$, no channel release can be achieved even though the standby channel between the stations B' and C is in a normal state, and accordingly, in such an event, switchover is prevented by detecting the standby channel fault with the receiving digital processing unit 217 (FIG. 4).

When the switching circuit 276 is active, the circuits 274 and 317 are connected to each other by the line 51. Upon detection of a channel fault by the receiving digital processing unit 274 (the channel monitoring signal detecting circuit 540 of FIG. 9) for monitoring the channels between the stations A and B', the information of that detection (shorted by a relay output) controls by way of the line 51 the channel monitoring signal generator 531 (FIG. 8) of the transmitting digital processing unit 317 (FIG. 5) which inserts the monitoring signal for the standby channel $D.S_{BC}$ between the stations B' and C. If, for example, the channel monitoring signal of the transmitting digital processing unit 317 of the station B' is "1101000" under normal conditions, the generator 531 in FIG. 8 generates a channel monitoring signal of "0000000" in response to a control signal 545 coming over the line 51, and the monitoring signal is modulated by the phase modulator 318 and transmitted to the station C. From the channel monitoring signal detecting circuit (513 in FIG. 7) of the receiving digital processing unit 217 of the station C (FIG. 4) is generated a channel fault alarm signal on the line 32 which is connected to the control unit 245. In this case, therefore, it is determined that there is a fault on the standby channel, and hence no switchover operation can be carried out even if a fault arises in the first regular channel.

Figure 8:
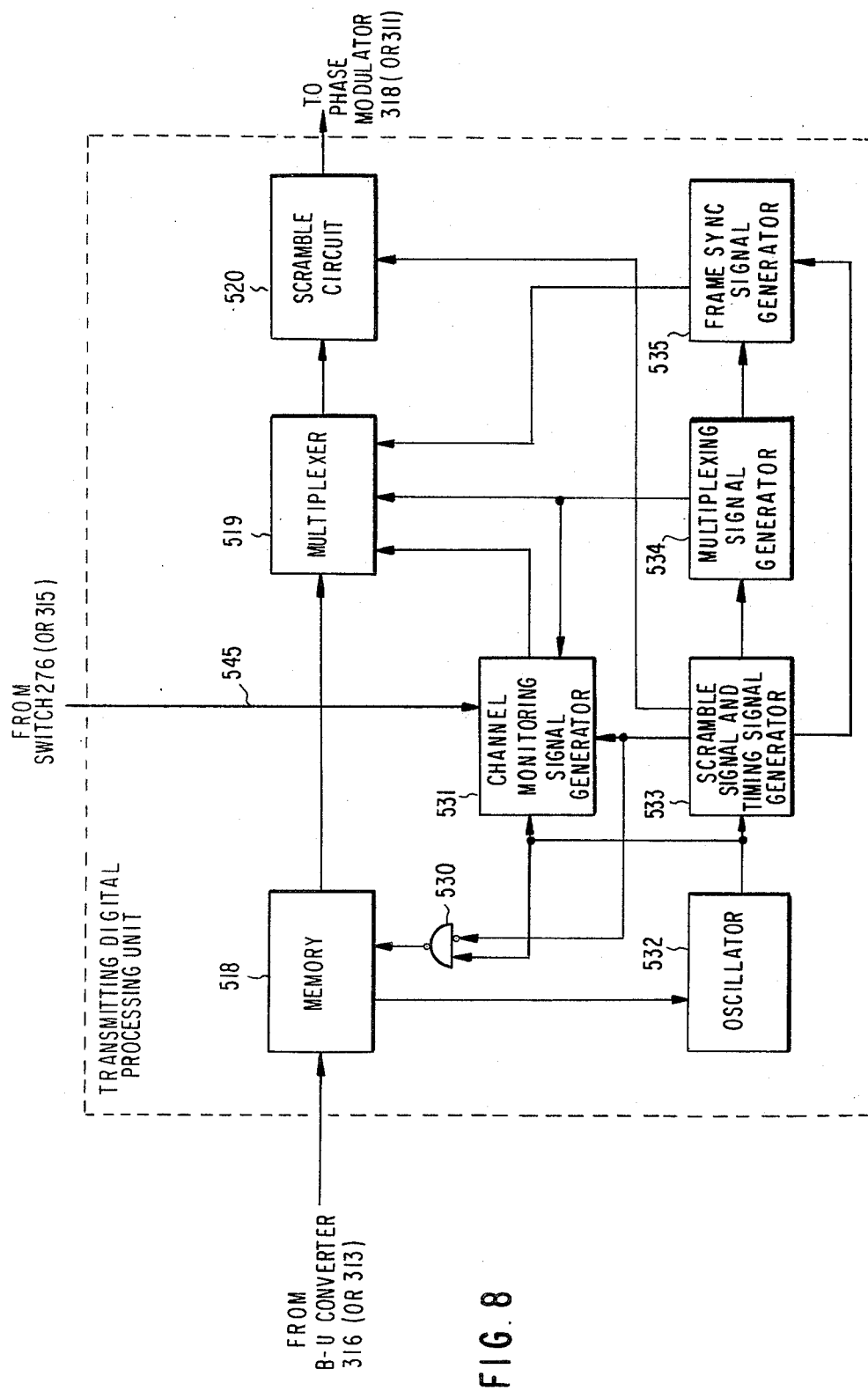
FIG. 8 is a block diagram of the transmitting digital processing unit 312 or 317 for the repeater station B' shown in FIG. 5.

The transmitting digital processing unit illustrated in FIG. 8 is composed of a memory 518, multiplexer 519, scramble circuit 520, gate 530, channel monitoring signal generator 531, oscillator 532, scramble signal and timing signal generator 533, multiplexing signal generator 534 and frame synchronizing signal generator 535. In the absence of a control signal from the switch 276, this digital processing unit 317 operates in the same way as the digital processing unit shown in FIG. 6. The receiving digital processing unit illustrated in FIG. 9, consisting of a descramble circuit 536, demultiplexer 537, memory 538, frame synchronizing circuit 539, channel monitoring detector 540, gate 541, descramble signal and timing signal generator 542, demultiplexing signal generator 543 and frame synchronizing signal generator 544, operates in the same manner as the receiving digital processing unit shown in FIG. 7.

(6) When the switch 276 has been operated, a signal indicating the completion of its action is fed to the control unit 294 over the line 86.

(7) The parallel transmission command signal, supplied from the control unit 336 over the line 87 as stated above, is further fed from the control unit 294 by way of the line 78 (or 77) to the transmitting oscillator 308 (314), the output of which frequency-modulated carrier signal which is then transmitted to the station A over the control channel.

(8) The parallel transmission command signal demodulated by the phase demodulator 135 or 143 of the station A (FIG. 2) is supplied to the control unit 100 by way of the line 15 (or 16). From the control unit 100 is fed a switchover signal to the transmitting switchover circuit 108 by way of the line 3.

(9) This transmitting switchover circuit 108, in response to the switchover signal, changes the connection from C to D to a connection from C to B. As a result, the multiplexed signals branched by the transmitting splitter 101 are transmitted to the station B' (FIG. 5) by way of the circuits 103-107 of the standby channel.

(10) When the switchover circuit 108 has completed its operation, a signal indicating completion is fed to the control unit 100 over the line 4. This completion signal is transmitted by the above-described method to the station B' over the downstream control channel.

(11) Upon receipt of this completion signal on the line 52, a channel non-fault signal from the receiving digital processing unit 274 on the line 53 and a pilot-off signal from the pilot detector 292 on the line 59, the control unit 294 of the station B' FIG. 5) generates a control signal for switching over from the regular to the standby channel. However, since the station B' according to the present invention, has no downstream receiving switchover circuit like the receiving switchover circuit 170 of the conventional station B (FIG. 3), this control signal has to be transmitted to the station C (FIG. 4). To accomplish this, first the control unit 294 controls the standby channel switchover circuit 291 with a control signal on the line 57 to change the connection from C to D to a connection from C to B.

(12) The standby channel switchover circuit 291 supplies a completion signal to the control unit 294 by way of the line 58.

(13) A signal to control the receiving switchover circuit 226 (FIG. 4) is sent from the unit 294 to the control unit 336 over the line 88.

(14) The control unit 336 feeds a switchover signal to the switchover circuit 333 for the standby channel by way of the line 62.

(15) The switchover circuit 333, in response to this switchover signal, changes the connection from C to D to a connection from C to B. At this stage, signals passing through the standby channel of the station A and the downstream standby reception channel of the station B' are now transmitted to the station C over the downstream standby transmission channel of the station B'.

(16) An information signal indicating the operation of the switchover circuit 333 is supplied to the control unit 336 over the line 63.

(17) The unit 336, using the downstream control channel, transmits to the station C the signal supplied from the circuit 294 by way of the line 88. This control signal is thus fed to the transmitting local oscillator 325 (or 321) through the line 48 (or 49), frequency-modulated and transmitted.

(18) The control signal demodulated by the phase demodulator 223 (or 216) of the station C (FIG. 4) is entered into the control unit 245 by way of the line 36 (or 33).

(19) Upon receipt of a channel non-disturbance signal from the receiving digital processing unit 217 over the line 32 and detection of a pilot-off signal from the pilot detector 244 over the line 40, the control unit 245 generates a signal to control the receiving switchover circuit 226 over the line 34.

(20) In response to this signal, the switchover circuit 226 changes the connection from C to D to a connection from C to B, and thereafter digital signals coming through the standby channel are fed to the multiplexer/demultiplexer unit 231.

(21) A completion signal from the switchover circuit 226 is supplied to the control unit 245 by way of the line 35.

(22) The completion signal from the switchover circuit 226 is fed to the circuit 263 (or 269) by way of the line 45 (or 46), and transmitted to the stations A and B' over the control channels in the same manner as earlier described.

The restoration of the first regular channel is accomplished by the following procedure.

(1) The receiving digital processing unit 224 of the station C (FIG. 4) supplies the information that the channel is in a normal state to the control unit 245 over the line 40.

(2) The control unit 245 so controls the switchover circuit 226 through the line 34 as to change the connection from C to B to a connection from C to D.

(3) A completion signal is entered into the unit 245 by way of the line 35.

(4) The unit 245, in the same manner as described above, transmits a signal to cancel the parallel transmission command to the station B' (FIG. 5) by way of the upstream control channel.

(5) After receiving this parallel transmission cancellation signal over the line 71 (or 72), the unit 336 of the station B' supplies it to the switchover circuit 333 through the line 62.

(6) The switchover circuit 333 changes the connection from C to B to a connection from C to D, and then supplies a completion signal to the unit 336 over the line 63.

(7) The unit 336 feeds the parallel transmission cancellation signal to the circuit 294 by way of the line 87, to the circuit 314 (or 308) by way of the line 77 (or 78), and further to the station A by way of the upstream control channel. Then, the switchover circuit 291, in response to the cancellation signal received by way of the line 57, changes the connection from C to B to a connection from C to D, and then feeds a completion signal to the unit 294 over the line 58.

It also releases the switch 276 through the line 50 to place it in the open state, and supplies a completion signal to the unit 294 by way of the line 87. At this stage, even if there occurs a fault on the second regular channel $R2_{BC}$, switchover can be achieved because the standby channel $S_{BC}$ between the stations B' and C is not engaged.

(8) The parallel transmission cancellation signal from the station B' is demodulated by the circuit 142 (or 134) of the station A, and fed to the control unit 100 by way of the line 10 (or 9).

(9) The unit 100 supplies the cancellation signal to the switchover circuit 108 through the line 3, thereby changing the connection from C to B to a connection from C to D, and receives a completion signal over the line 4.

(10) A pilot from the pilot generator 123 is transmitted to the station B' over the standby channel, and detected by the pilot detector 292 (FIG. 5).

The switchover flow in the event of a fault on the second regular channel D.R2$_{AB}$ between the stations A and B' will be described below.

(1) A channel fault signal from the digital processing unit 287 of the station B' is fed to the control unit 294 by way of the line 54.

(2) If both the output 53 of the receiving digital processing unit 274 for the standby channel and the output 59 of the pilot detector 292 are normal, a parallel transmission command signal is transmitted to the station A by way of the upstream control channel. This parallel transmission command signal is supplied from the control unit 294 to the transmitting local oscillator 308 (or 314) through the line 78 (or 77), frequency-modulated and transmitted to the station A. Since this parallel transmission command signal to the station A has not been sent from the control unit 336, the control unit 294 gives neither a control signal to control the switchover circuit 291 nor a control signal to control the switch 276 to inform the station C of the presence or absence of a fault on the standby channel between the stations A and B'.

(3) The signal demodulated by the demodulator 134 (or 142) of the station A is entered into the control unit 100 by way of the line 9 (or 10).

(4) The control unit 100 supplies a signal to control the transmitting switchover circuit 115 through the line 5.

(5) The switchover circuit 115 changes the connection from C to D to a connection from C to B, and the multiplexed signals branched by the transmitting splitter 121 are transmitted to the station B' over the standby channel.

(6) A completion information signal from the transmitting switchover circuit 115 is entered into the control unit 100, and transmitted to the station B' over the downstream control channel. This completion signal is fed to the transmitting local oscillator 118 (or 112) by way of the line 2 (or 1), frequency-modulated and transmitted to the station B'.

(7) The signal demodulated by the demodulator 281 (or 273) of the station B' (FIG. 5) is entered into the control unit 294 through the line 89 (or 52).

(8) If parallel transmission is effected at the station A, the output 53 of the receiving digital processing unit 274 is normal and the output 59 of the pilot detector 292 indicates the pilot to be off, the control unit 294 controls the receiving switchover circuit 289 through the line 55.

(9) The switchover circuit 289 changes the connection from C to D to a connection from C to B, and the signals passing through the standby channel are entered into the multiplexer/demultiplexer unit 282.

(10) A completion signal from the circuit 289 is entered into the unit 294 and transmitted to the station A from the line 77 (or 78) by way of the upstream control channel.

(11) The control unit 100 of the station A, confirming the presence of the completion signal on the line 16 (or 15), fully completes the switchover procedure.

The restoration flow of the second regular channel D.R2$_{AB}$ between the stations A and B' will be described below.

(1) The circuit 287 of the station B' sends a channel fault release signal to the control unit 294 over the line 54.

(2) The switchover circuit 289 is controlled so that the circuit 288 is connected to the multiplexer/demultiplexer unit 282.

(3) A restoration signal from the circuit 289 is entered into the unit 294 by way of the line 56.

(4) This information is transmitted to the station A by way of the upstream control channel.

(5) At the station A, this information is received by way of the line 15 (or 16), and an appropriate control operation is performed to release the switchover circuit 115 from the parallel transmission command.

(6) The unit 100, confirming the presence of the completion signal from this circuit 115, fully completes the restoration procedure.

(7) The pilot detector 292 of the station B' detects a pilot from the circuit 123.

The switchover procedure in the event of a fault on the second regular channel D.R2$_{BC}$ between the stations B' and C will be described below.

(1) A channel fault signal emerging in the output 39 of the digital processing unit 241 of the station C (FIG. 4) is supplied to the control unit 245.

(2) If both the output 32 of the receiving digital processing unit 217 and the output 40 of the pilot detector 244 are normal, a parallel transmission command signal is transmitted to the station B' (FIG. 5) over the upstream control channel, which is the same route as that used in the aforementioned case of a disturbance on the first regular channel.

(3) The control unit 336 of the station B' controls the transmitting switchover circuit 327 through the line 60 to cause branched signals from the transmitting splitter 326 to be supplied to the standby channel for transmission to the station C. The transmitting switchover circuit 327 sends a completion information signal to the control unit 326 by way of the line 61. Since the presence of the transmission switchover circuit 327 for the second regular channel between the stations B' and C makes it possible to achieve parallel transmission on the part of the station B', there is no need for the station A to transfer a parallel transmission command signal.

Therefore, neither the switchover circuit 333 for the standby channel nor the switch 276 for transferring any disturbance on the standby channel between the stations A and B' to the station C operates, with the result that, even if a disturbance occurs on the standby channel between the stations A and B', switchover of the second regular channel between the stations B' and C can be achieved without difficulty.

(4) A completion signal from the switchover circuit 327 is fed to the control unit 326 through the line 61, then to the transmitting oscillator 321 (or 325) through the line 48 (or 49), frequency-modulated and transmitted to the station C over the downstream control channel.

(5) The control signal demodulated by the receiving demodulator 216 (or 223) of the station C is supplied by way of the line 33 (or 36) to the control unit 245, which thereby confirms that the transmitting switchover circuit 327 of the station B' has operated.

(6) Since, as a result of the switchover of the transmitting switchover circuit 327 of the station B', a different signal from that which would otherwise be received from the pilot generator 335 is received by the pilot detector 244, a pilot-off signal (indicated by the line 40A being shorted) is fed to the control unit 245 over the line 40A. Therefore, upon receipt of an information signal indicating the operation of the transmitting switchover circuit 327 (the condition of paragraph (5)), a pilot-off signal in the output 40A of the pilot detector 244 and a signal indicating the output 32 of the receiving digital processing unit 217 to be normal, the control unit 245 switches over the receiving switchover circuit 243 through the line 37.

(7) The receiving switchover circuit 243 is switched over so that the signals passing through the standby channel are fed to the multiplexer/demultiplexer unit 231.

(8) A completion signal (indicated by the line 38 being shorted) from the receiving switchover circuit 243 is supplied to the control unit 245 over the line 38.

(9) It is necessary that this completion signal be transmitted to the terminal station A (or a manned terminal station) to inform it of the completion of the switchover of the second regular channel between the stations B' and C. This transmission is achieved by way of the downstream control channel, as in the aforementioned case of the switchover of the first regular channel.

The procedure of achieving restoration from this operation is similar to the restoration procedure described.

Since standby channels are commonly used by both long and short channels, switchover from a regular to a standby channel is accomplished on a first-come-first served basis. If, for instance in the downstream direction, faults arise on the first regular channel and the second regular channel between the stations A and B', the control unit 100 will receive parallel transmission command signals for both, and the first received will given priority and the second will be ineffective.

If faults occur on the first regular channel and the second regular channel between the stations B' and C, the control unit 245 will receive channel fault signals for both, and the first received will be given priority and a parallel transmission command signal sent to the station B' while the second will be ineffective.

Since separate standby channels can be used for the second regular channel between the stations A and B' and the second regular channel between the stations B' and C, these regular channels can be switched over at the same time.

What is claimed is:

1. A channel switching method for use in a digital communication system having a repeater station linking first and second stations with at least first and second regular channels and a standby channel, said first and second regular channels including a regenerative relay channel and a dropping/insertion channel at said repeater station, respectively, and each of said channels being capable of carrying a digital signal, said method comprising the steps of:
   (1) detecting at said second station a channel fault condition on each of said first channel and said standby channel and providing a first control signal upon detections of a fault on said first regular channel and a non-fault on said standby channel;
   (2) transmitting at said second station said first control signal from said second station to said first station through said repeater station;
   (3) transmitting at said first station said digital signal over said first regular channel and said standby channel in response to said first control signal, providing a second control signal indicative of said transmitting, and transmitting said second control signal to said repeater station;
   (4) transmitting at said repeater station a third control signal indicative of the presence or absence of a fault on said standby channel between said first station and said repeater station to said second station in response to at least said second control signal;
   (5) providing at said repeater station a fourth control signal in response to at least said second control signal;
   (6) connecting at said repeater station said standby channel between said first station and said repeater station to the standby channel between said repeater station and second station in response to said fourth control signal, and providing a fifth control signal indicative of said connecting;
   (7) transmitting at said repeater station said fifth control signal to said second station; and
   (8) switching over at said second station said first regular channel to said standby channel in response to at least said third and fifth control signals at said second station.

2. The channel switching method for use in a digital communication system as claimed in claim 1, further comprising the steps of:
   (9) at said second station, providing a sixth control signal upon detection of a fault on said second regular channel between said repeater station and second station;
   (10) at said second station, transmitting said sixth control signal to said repeater station;
   (11) transmitting another digital signal over said standby and second regular channels between said repeater station and second station in response to said fifth control signal at said repeater station, providing a seventh control signal indicative of said transmitting said another digital signal over said standby channel, and transmitting said seventh control signal to said second station; and
   (12) at said second station, switching over said second regular channel to said standby channel in response to at least said seventh control signal.

3. A channel switching method for use in a digital communication system having a repeater station linking first and second stations with at least first and second regular channels and a standby channel, said first and second regular channels including a regenerative relay channel and a dropping/insertion channel at said repeater station, respectively, and each of said channels being capable of carrying a digital signal, wherein a fault occurs in said first regular channel, said method comprising the steps of:
   (1) at said second station, detecting a channel fault condition on a first regular channel at said second station;
   (2) at said second station, determining whether an output of a standby channel and an output of a pilot detector in said standby channel are normal, performing no channel switching operation if said output of said pilot detector is not normal, and transmitting a parallel transmission command signal, if a fault on said first regular channel is detected and said output of said standby channel and said output of said pilot detector are normal, to said repeater station on an upstream control channel between said second station and said repeater station;
   (3) at said repeater station, transferring said parallel transmission command signal to said first station on an upstream control channel, and registering said parallel transmission command signal at said repeater station;

(4) at said repeater station, detecting the presence or absence of a fault on the standby channel between said first station and said repeater station, informing said second station of the presence or absence of a fault on said standby channel between said first station and said repeater station by connecting said standby channel between said first station and said repeater station to said standby channel between said repeater station and said second station;

(5) at said first station, generating a switchover signal in response to said parallel transmission command signal received at said first station;

(6) at said first station, switching over said first regular channel between said first station and said repeater station to said standby channel between said first station and said repeater station in response to said switchover signal;

(7) at said first station, transmitting a completion signal over a downstream control channel between said first station and said repeater station to said repeater station in response to completion of switching over in step (6);

(8) at said repeater station, generating a control signal for switching over from the regular to the standby channel in response to said completion signal, a channel non-fault signal corresponding to said standby channel between said first station and said repeater station, and a pilot-off signal, and transmitting said control signal to said second station on a downstream control channel between said repeater station and said second station;

(9) at said repeater station, connecting signals received over said standby channel between said first station and said repeater station to said standby channel between said repeater station and said second station; and

(10) at said second station, in response to said control signal, a channel non-fault signal corresponding to said standby channel between said repeater station and said second station and a pilot-off signal, operating a receiving switchover circuit to receive signals from said standby channel between said repeater station and said second station.

4. The channel switching method of claim 3 further comprising restoring said first regular channel comprising the steps of:

(11) at said second station, determining that said first regular channel between said repeater station and said second station is in a normal state;

(12) at said second station, switching over said switchover circuit to receive signals from said first regular channel between said repeater station and said second station when said first regular channel is in a normal state in step (11);

(13) at said second station, transmitting a signal to cancel said parallel transmission command signal to said repeater station over said upstream control channel between said second station and said repeater station;

(14) at said repeater station, disconnecting said standby channel between said first station and said repeater station from said standby channel between said repeater station and said second station;

(15) at said repeater station, transmitting said parallel transmission cancelation signal from said repeater station to said first station over said upstream control channel between said repeater station and said first station; and

(16) at said first station, switching over from said standby channel between said first station and said repeater station to said first regular channel between said first station and said repeater station in response to said parallel transmission cancelation signal.

5. A channel switching method for use in a digital communication system having a repeater station linking first and second stations with at least first and second regular channels and a standby channel, said first and second regular channels including a regenerative relay channel and a dropping/insertion channel at said repeater station, respectively, and each of said channels being capable of carrying a digital signal, wherein a fault occurs in said second regular channel between said first station and said repeater station, said method comprising the steps of:

(1) at said repeater station, producing a channel fault signal indicative of said fault in said second regular channel between said first station and said repeater station;

(2) at said repeater station, if an output of the standby channel between said first station and said repeater station and an output of a pilot detector connected to said standby channel between said first station and said repeater station are normal, transmitting a parallel transmission command signal to said first station on an upstream control channel between said repeater station and said first station in response to said channel fault signal, and if said output of said pilot detector is not normal, performing no channel switching operation;

(3) at said first station, generating a switchover signal and coupling said switchover signal to a transmitting switchover circuit in response to said parallel transmission command signal received at said first station;

(4) at said first station, transmitting signals from said second regular channel between said first station and said repeater station simultaneously over said standby channel between said first station and said repeater station;

(5) at said first station, transmitting a completion information signal from said transmitting switchover circuit to said repeater station and transmitting in parallel said digital signal over said standby channel and said first regular channel to said repeater station in response to completion of switchover by said transmitting switchover circuit;

(6) at said repeater station, determining if the parallel transmission of said digital signal is effected at said first station, and if parallel transmission is effected at said first station and an output of a pilot detector coupled to said second regular channel between said first station and said repeater station is off, operating a receiving switchover circuit; and (7) at said repeater station, transmitting a completion signal from said receiving switchover circuit indicative of completion of switchover of said receiving switchover circuit to said first station over said upstream control channel between said repeater station and said first station.

6. The channel switching method of claim 5 further comprising restoring said second regular channel between said first station and said repeater station, comprising the steps of:

(8) at said repeater station, generating a channel fault release signal and operating said receiving switchover circuit in response to said channel fault release signal;

(9) at said repeater station, transmitting a restoration signal from said receiving switchover circuit to said first receiving station over said upstream control channel between said repeater station and said first station; and

(10) at said first station, operating said transmitting switchover circuit to release said first station from parallel transmission.

7. A channel switching method for use in a digital communication system having a repeater station linking first and second stations with at least first and second regular channels and a standby channel, said first and second regular channels including a regenerative relay channel and a dropping/insertion channel at said repeater station, respectively, and each of said channels being capable of carrying a digital signal, wherein a fault occurs in said second regular channel between said repeater station and said second station, said method comprising the steps of:

(1) producing at said second station a channel fault signal indicative of a fault on said second regular channel between said repeater station and said second station;

(2) at said second station, if an output of said standby channel between said repeater station and said second station and the output of a pilot detector coupled to said standby channel between said repeater station and said second station are normal, transmitting a parallel transmission command signal to said repeater station over an upstream control channel between said second station and said repeater station in response to said channel fault signal, and if said output of said pilot detector is not normal, performing no channel switching operation;

(3) at said repeater station, operating a transmitting switchover circuit to cause parallel transmission over said second regular channel and said standby channel between said repeater station and said second station;

(4) at said repeater station, transmitting a completion signal from said transmitting switchover circuit to said second station over a downstream control channel between said repeater station and said second station when the parallel transmission in step (3) is completed;

(5) at said second station, operating a receiving switchover circuit in response to said transmission completion signal from said repeater station and a pilot-off signal from a pilot detector coupled to said standby channel to accept signals from said standby channel between said repeater station and said second station; and (6) transmitting a completion signal from said receiving switch over circuit to said repeater station and said first station over a downstream control channel between said second station and said repeater station and said repeater station and said first station.

8. A channel switching system for use in a digital communication system having a repeater station linking first and second stations with at least first and second regular channels and a standby channel, said first and second regular channels including a regenerative relay channel and a dropping/insertion channel at said repeater station, respectively, and each of said channels being capable of carrying a digital signal, said system comprising:

(1) means for providing a first control signal upon detections of a fault on said first regular channel and a nonfault on said standby channel at said second station;

(2) means for transmitting said first control signal from said second station to said first station through said repeater station;

(3) means for informing said second station of the presence or absence of a fault on said standby channel between said first station and said repeater station in response to at least said first control signal at said repeater station;

(4) means for transmitting said digital signal over said first regular channel and said standby channel in response to said first control signal at said first station, providing a second control signal indicative of said transmitting, and transmitting said second control signal to said repeater station;

(5) means for providing a third control signal in response to at least said second control signal at said repeater station;

(6) means for connecting said standby channel between said first station and said repeater station to the standby channel between said repeater station and said second station in response to said third control signal, and providng a fourth control signal indicative of said connecting;

(7) means for transmitting said fourth control signal to said second station; and (8) means for switching over said first regular channel to said standby channel in response to at least said fourth control signal at said second station.

9. The channel switching system for use in a digital communication system as claimd in claim 8, further comprising:

(9) means for providing a fifth control signal upon detection of a fault on said second regular channel between said repeater station and said second station at said second station;

(10) means for transmitting said fifth control signal to said repeater station;

(11) means for transmitting a digital signal over said standby and second regular channels between said repeater station and second station response to said fifth control signal at said repeater station, providing a sixth control signal indicative of said transmitting said digital signal over said standby channel, and transmitting said sixth control signal to said second station; and

(12) means for switching over said second regular channel to said standby channel in response to at least said sixth control signal at said second station.

10. A repeater station for use in a digital communication system linking first and second stations with at least first and second regular channels and a standby channel, said first and second regular channels including a regenerative relay channel and a dropping/insertion channel at said repeater station, respectively, and each of said channels being capable of carrying a digital signal, said repeater station comprising:

(1) a downstream receiver section, said downstream receiver section comprising first through third receiving circuits for each of said standby channel and said first and second regular channels, respectively, between said first station and said repeater station;

(2) first and second digital processing units having inputs coupled to outputs of said first and third receiver sections, respectively;

(3) first and second U/B converters having inputs coupled to outputs and said first and second digital processing units, respectively;

(4) first and second receiving switchover circuits receiving outputs from said first and second U/B converters respectively;

(5) first through third downstream transmitter circuits for a standby channel and first and second regular channels between said repeater station and said second station, respectively, an output of said second receiving circuit being coupled directly to an input of said second transmitter circuit;

(6) first and second transmitting digital processing units having outputs coupled to inputs of said first and third transmitter circuits, respectively;

(7) switching means for selective connecting an output of said first receiving digital processing unit to an input of said first transmitting digital processing unit;

(8) first and second B/U converters having outputs coupled to inputs of said first and second transmitting digital processing units, respectively;

(9) first and second multiplexer/demultiplexer units, said first multiplexer/demultiplexer unit receiving an output signal from said first receiving switchover circuit;

(10) a signal splitter receiving an output signal from said second multiplexer/demultiplexer unit; and

(11) first and second transmitting switchover circuits, said first transmitting switchover circuit receiving an output signal from said second receiving switchover circuit and said second transmitting switchover circuit receiving output signals from said signal splitter and said first transmitting switchover circuit, said second transmitting switchover circuit having an output coupled to an input of said first B/U converter.

* * * * *

UNITED STATES PATENT AND TRADEMARK OFFICE
CERTIFICATE OF CORRECTION

PATENT NO. : 4,442,518
DATED : April 10, 1984
INVENTOR(S) : Hideaki MORIMOTO

It is certified that error appears in the above-identified patent and that said Letters Patent is hereby corrected as shown below:

Column 1, line 46, "of" should be --at--;

line 52, insert --a-- after "in".

Column 2, line 26, delete "," after "and".

Column 3, line 19, delete "," after "channel" and insert --and second regular channel,--.

Column 4, line 8, change "245" to --254--;

line 30, delete "sequence".

Column 5, line 50, delete "wave" and insert --signal--.

Column 6, line 55, after "undergo", insert --coherent--.

UNITED STATES PATENT AND TRADEMARK OFFICE
CERTIFICATE OF CORRECTION

PATENT NO. : 4,442,518

DATED : April 10, 1984

INVENTOR(S) : Hideaki MORIMOTO

It is certified that error appears in the above-identified patent and that said Letters Patent is hereby corrected as shown below:

Column 7, line 62, "demondulator" should be

Column 8, line 22, delete "into" and insert --at--.

Column 10, line 68, "modulated" should be --modulates--; after "modulates" insert --the--.

Column 11, line 24, before "FIG." insert --(--;

line 26, after "B'", insert --,--.

Column 15, line 29, before "given" insert --be--.

Signed and Sealed this

Nineteenth Day of February 1985

[SEAL]

Attest:

DONALD J. QUIGG

Attesting Officer

Acting Commissioner of Patents and Trademarks